UNITED STATES PATENT OFFICE

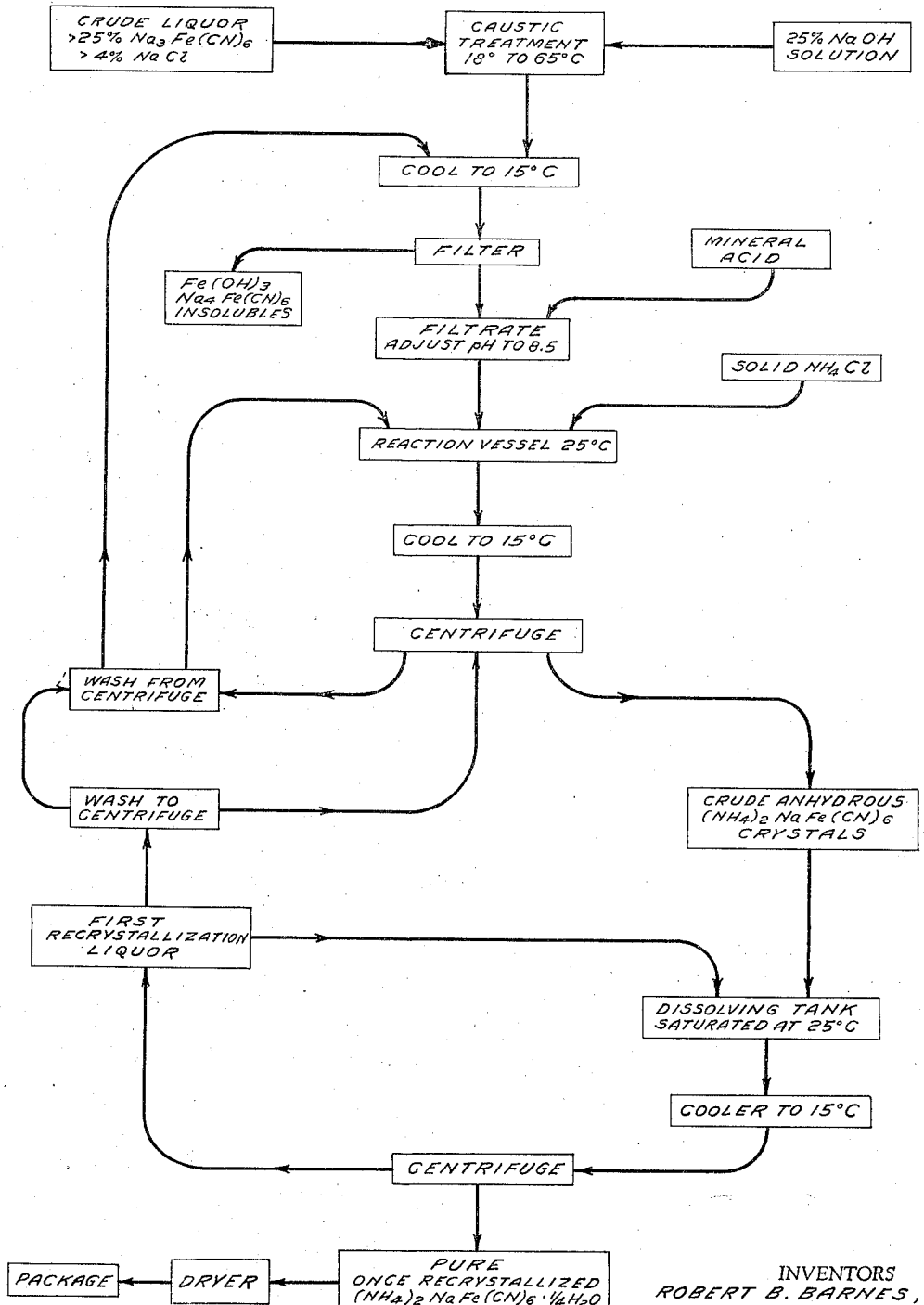

2,362,183
METHOD OF PRODUCING DIAMMONIUM MONOALKALI METAL FERRICYANIDE

Robert B. Barnes and Leonard Patrick Moore, Stamford, Conn., assignors to American Cyanamid Company, New York, N. Y., a corporation of Maine Application February 14, 1940, Serial No. 318,896

23 Claims. (Cl. 23—77)

The present invention relates to methods of producing diammonium monoalkali metal ferricyanide.

The principal object of the invention is to replace two molecules of alkali metal in alkali metal ferricyanide with ammonium radicals in a simple procedure leading to the recovery of the double ammonium alkali metal salt in crystal form with minimum difficulties.

A solution containing alkali metal ferricyanide may be readily obtained by chlorinating a solution of the corresponding ferrocyanide. As a result of this chlorination procedure, the final solution contains alkali metal chloride as a natural consequence of the reaction. Relatively pure crystals of alkali metal ferricyanide may be obtained from such solutions by suitable fractional crystallization through cooling or evaporation or both.

It has been determined that when a soluble ammonium salt is added to a solution of an alkali metal ferricyanide where the former is added in excess of that necessary for a metathetical reaction, there may exist in this reaction mixture unreacted alkali metal ferricyanide, unreacted original ammonium salt, triammonium ferricyanide, monoammonium dialkali metal ferricyanide, and diammonium monoalkali metal ferricyanide. As to which one of these compounds may be most readily crystallized from the reaction mixture depends upon their relative solubilities. That is, upon evaporation or cooling or both, the compound least soluble will be precipitated.

When using a soluble inorganic ammonium salt, the diammonium monoalkali metal ferricyanide is least soluble of those existing in the solution and, consequently, will be first precipitated under proper conditions.

In practice, it is preferred to start with a solution of alkali metal ferricyanide containing some alkali metal chloride inasmuch as the desired double salt of ammonium is less soluble in such solutions containing alkali metal chlorides than in a solution containing alkali metal ferricyanide alone or in water alone. The invention contemplates, however, the use as an initial material of pure or relatively pure alkali metal ferricyanide in water.

If the double salt of ferricyanic acid containing ammonium is to be used in the liquid state, a solution of a water soluble inorganic ammonium salt may be added to the solution of the alkali metal ferricyanide or vice versa. The fact that such solutions also may contain unreacted alkali metal ferricyanide, triammonium ferricyanide and inorganic ammonium salts in many cases makes no difference. Such a situation is where the eventual solution is to be used in blueprint or other similar arts where the light sensitiveness of the ferricyanic salt containing ammonium is of advantage. In other situations, however, where a pure or relatively pure ammonium alkali metal ferricyanide is desired fractional crystallization may be resorted to to recover the pure material substantially uncontaminated with other products.

In the latter case, that is, where crystalline material is desired and is to be obtained through evaporation and/or cooling procedures, it is desirable of course, that an initial solution containing the desired material be as concentrated as possible. Under these circumstances, the process may be efficiently practiced by adding the inorganic water soluble ammonium salt in solid form so as to avoid the introduction of water.

The flow sheet diagrammatically represents a procedure in which a crude aqueous solution containing preferably >25% alkali metal ferricyanide is treated with a 25% caustic soda solution at from 18 to 65° C. for the purpose of ridding the solution of ferri ferri complexes, sodium ferrocyanide or the like. The batch is then cooled to 15° C. and filtered to remove ferric hydroxide, sodium ferrocyanide and other insolubles. The pH of the filtrate is then adjusted to 8.5 with a mineral acid, preferably hydrochloric, and the resultant pre-treated solution is then satisfactory for the production of diammonium monosodium ferricyanide.

Where an initial alkali metal ferricyanide solution, pure or relatively pure, is available, this pre-caustic treatment may be omitted.

The sodium ferricyanide in solution is now reacted with a water soluble inorganic ammonium salt, preferably in solid phase. This solution of alkali metal ferricyanide, in order to insure an efficient recovery of crystalline ammonium alkali metal ferricyanide per pass, should be reasonably concentrated as otherwise excessive cooling or evaporation or both will be necessary to recover a crop of double salt crystals. Where the mother liquor, however, drained from the double salt crystals is recirculated, this is not so important inasmuch as no substantial losses will occur.

As above stated, the initial solution of alkali metal ferricyanide may be one obtained by dissolving that material in water to the proper concentration or it may be a reaction mixture obtained from the oxidation as by chlorine of the corresponding alkali metal ferrocyanide. In any event, a solution containing at least 25 grams of alkali metal ferricyanide per 100 cc. is preferred. To this solution is added preferably a solid water soluble inorganic ammonium salt where eventual crystals are to be obtained, although where a solution is to be used, the ammonium salt may be added dissolved in water.

For most efficient results, the liquid in the reaction vessel should be substantially saturated in order to insure an efficient crop of double ferricyanide crystals per pass. This is indicated by the fact that diammonium alkali metal ferricyanide is much less soluble in saturated ammonium salt solutions at room temperature than in water alone or in a solution containing alkali metal ferricyanide.

While it is preferred that the liquid in the reaction vessel be maintained at substantially 25° C., thus not necessitating an artificial cooling effect, yet temperatures above or below this may be used. If higher temperatures are used, a lesser amount of double salt crystals per pass will be obtained inasmuch as more of the salt remains in the mother liquor. If lower temperatures are used, a greater crop of final crystals will be obtained but at an added cost due to the artificial cooling effect.

It is preferred that the water soluble inorganic ammonium salt be added to the alkali metal ferricyanide in the molar proportions of 3:1. Use of more salt only slightly increases the yield but contaminates the crystalline product with precipitated, unconverted salt, while use of less salt lowers the yield.

While any alkali metal ferricyanide may be used as the starting material for the production of the ammonium alkali metal ferricyanide, yet that of sodium is preferred by reason of its cheapness. Any water soluble inorganic ammonium salt may be used, such as the sulfate, nitrate and chloride, although the latter is preferred from the standpoint of cost.

The contents of the reaction vessel where the double salt to be obtained is in crystalline form may then be either cooled or evaporated or both. Where cooling is resorted to, a temperature must not be reached which would cause precipitation of other compounds from the solution. For instance, where an initial reaction was obtained between sodium ferricyanide and ammonium sulfate so as to produce a saturated sulfate ferricyanide solution, when the reaction mixture was cooled to 10° C., a copious crystallization occurred which, when subjected to microchemical tests, were determined to be sodium sulfate tinted with ferricyanide.

If the original reaction was carried out at 25° C., no cooling is necessary to obtain an initial crop of crude diammonium monoalkali metal ferricyanide crystals. However, cooling to 15° C. insures a good crystallization effect.

Evaporation may be resorted to for crystallization purposes and in such an event, it is preferred to blow a stream of warm air onto an extended area of the solution containing the reaction material. Heating of the entire body of the solution is generally undesirable due to the tendency of substances therein to decompose and also by reason of the fact that such solutions must again be cooled, after concentration in order to avoid return of excessive quantities of the double salt in the mother liquor.

Slow evaporation of the saturated solution from the reaction vessel at room temperature leads to the growth of large cubical crystals of diammonium monoalkali metal ferricyanide measuring as much as one cm. on a side. If a current of warm air is directed normal to the surface of the non-agitated liquor, rosettes of crystals are formed, some of which may float on the surface, having a diameter as much as one inch.

In any event, evaporation or cooling may be continued as long as an analysis shows that the crop of crystals obtained is free or substantially free from contaminating impurities. The magma is then filtered and the crude crop of crystals, after being washed with liquor from a first recrystallization, may be either used as such or recrystallized from water. The crude crystals analyze 94% $(NH_4)_2NaFe(CN)_6$, 3% $NH_4Cl$ and 2.2% $NaCl$. The mother liquor from the filtering operation may be returned to the reaction vessel or the initial cooler so that the values therein are not lost and the process thus becomes cyclic.

The crude, anhydrous diammonium monoalkali metal ferricyanide crystals are then dissolved in water or liquor from a first recrystallization so as to obtain a saturated solution at about 25° C. Upon cooling to 15° C., pure diammonium monoalkali metal ferricyanide is crystallized, which was found to be a mixture of the anhydrous and dihydrated material equivalent to $\frac{1}{4}H_2O$ and containing less than 1% chlorides. After centrifuging, this once recrystallized material may then be air-dried and packaged.

The filtrate obtained by centrifuging the once recrystallized material may be returned to the cycle either to dissolve the crude anhydrous double salt or to a previous point.

For example, beginning with an aqueous solution of sodium ferricyanide, resulting from the chlorination of sodium ferrocyanide and containing approximately 30 grams of the former per 100 cc. as well as from 5 to 6 grams of sodium chloride per 100 cc., there was added thereto at 25° C. a quantity of ammoanium chloride in the molar ratio of 3:1 with respect to the sodium ferricyanide. Upon standing, a copious crop of crystals was obtained which were filtered from the mother liquor, the latter being returned to the cycle. A saturated solution of the crude material was made at 70° C. This solution was filtered and allowed to cool to room temperature. Small bright red crystals separated from the solution which were filtered off and dried. Analysis showed 77% $Fe(CN)_6\equiv$. This indicates 98.5% anhydrous $(NH_4)_2NaFe(CN)_6$.

The following approximate indices were determined on crystals in position of extinction:

$$N_1 = 1.595$$
$$N_2 = 1.590$$
$$N_3 = 1.586$$

These double ammonium alkali metal ferricyanide salts have been found to be of particular use in light sensitive work such as in the blueprint and photographic arts. They are also useful as pigments in other works, due to the fact that ferricyanides containing the ammonium radical have been found to produce more intense blues than alkali metal ferricyanides.

While the invention has been shown and described with particular reference to specific embodiments, it is to be understood that it is not to be limited thereto but is to be construed broadly and restricted solely by the scope of the appended claims.

We claim:

1. A method of producing ammonium alkali metal ferricyanide which includes reacting in aqueous solution an inorganic ammonium salt and alkali metal ferricyanide.

2. A method of producing ammonium alkali metal ferricyanide which includes reacting in aqueous solution an inorganic ammonium salt and alkali metal ferricyanide, the ammonium salt being added in excess of an amount necessary to form diammonium mono alkali metal ferricyanide.

3. A method of producing ammonium alkali metal ferricyanide, which includes adding to an aqueous solution of alkali metal ferricyanide a quantity of a solid inorganic ammonium salt.

4. A method of producing ammonium alkali metal ferricyanide, which includes adding to an aqueous solution of alkali metal ferricyanide a quantity of a solid inorganic ammonium salt, the latter being added in a ratio of 3 mols of the ammonium salt to one mol of alkali metal ferricyanide.

5. A method of producing ammonium alkali metal ferricyanide, which includes adding to an aqueous solution of alkali metal ferricyanide a quantity of a solid inorganic ammonium salt at 25° C.

6. A method of producing ammonium alkali metal ferricyanide, which includes adding to an aqueous solution of alkali metal ferricyanide a quantity of a solid inorganic ammonium salt at 25° C., maintaining said temperature, and separating out the diammonium alkali metal ferricyanide, which crystallizes.

7. A method of producing ammonium alkali metal ferricyanide, which includes adding to an aqueous solution of alkali metal ferricyanide a quantity of a solid inorganic ammonium salt, evaporating water from the reaction mixture and recovering the crystals formed.

8. A method of producing ammonium alkali metal ferricyanide, which includes adding to an aqueous solution of alkali metal ferricyanide containing alkali metal chloride, a solid inorganic ammonium salt and recovering crystals of diammonium monoalkali metal ferricyanide therefrom.

9. The method of claim 3 in which the alkali metal is sodium.

10. The method of claim 3 in which the ammonium salt is the chloride.

11. The method of claim 3 in which the alkali metal is sodium and the ammonium salt is the chloride.

12. The method of claim 8 in which the alkali metal is sodium.

13. The method of claim 8 in which the ammonium salt is the chloride.

14. The method of claim 8 in which the alkali metal is sodium and the ammonium salt is the chloride.

15. The method of claim 8 in which the alkali metal is sodium and the ammonium salt is the chloride and the initial addition is made at 25° C., crystallization being obtained by cooling.

16. The method of claim 8 in which the alkali metal is sodium and the ammonium salt is the chloride and the initial addition is made at 25° C., crystallization being obtained by evaporation.

17. The method of claim 8 in which the alkali metal is sodium and the ammonium salt is chloride, these salts being reacted in the proportion of one mol of sodium ferricyanide to three mols of ammonium chloride.

18. The method of claim 1 in which ammonium alkali metal ferricyanide crystals are obtained from the reaction mixture, recovering the same therefrom and returning the mother liquor to the cycle.

19. The method of claim 8 in which ammonium alkali metal ferricyanide crystals are obtained from the reaction mixture, recovering the same therefrom and returning the mother liquor to the cycle.

20. The method of claim 8 in which the alkali metal is sodium and the ammonium salt is chloride, these salts being reacted in the proportion of 1 mol of sodium ferricyanide to 3 mols of ammonium chloride and the ammonium alkali metal ferricyanide crystals are obtained from the reaction mixture, recovering the same therefrom and returning the mother liquor to the cycle.

21. A method of producing diammonium monosodium ferricyanide which includes the steps of adding solid ammonium chloride to a solution containing greater than 25% of sodium ferricyanide, in the ratio of three mols of ammonium chloride to one mol of sodium ferricyanide, cooling the resultant reaction mass to a diammonium monosodium ferricyanide crystallizing temperature, freeing the thus formed crystals from the mother liquor, and returning the latter to the cycle.

22. The method of claim 21 with the additional steps of recrystallizing the thus obtained crude diammonium monosodium ferricyanide, freeing the thus purified material from the recrystallization liquor, dissolving oncoming quantities of crude crystals therein, and repeating the cycle.

23. A method of producing diammonium monosodium ferricyanide which includes the steps of adding solid ammonium chloride to a solution containing greater than 25% sodium ferricyanide in the ratio of three mols of ammonium chloride to one mol of sodium ferricyanide, cooling the resultant mass to substantially 15° C., freeing the thus formed crude crystals of diammonium monosodium ferricyanide from the mother liquor, making a water solution of the crude crystals which is saturated at substantially 25° C., cooling the thus obtained solution to substantially 15° C., separating the thus recrystallized diammonium monosodium ferricyanide crystals from the mother liquor and returning the mother liquor from the recrystallization to the cycle.

ROBERT B. BARNES.
LEONARD PATRICK MOORE.